April 29, 1952
J. D. STEVENS
2,595,177
PEANUT HARVESTER PICKUP
Filed April 10, 1946
4 Sheets-Sheet 1
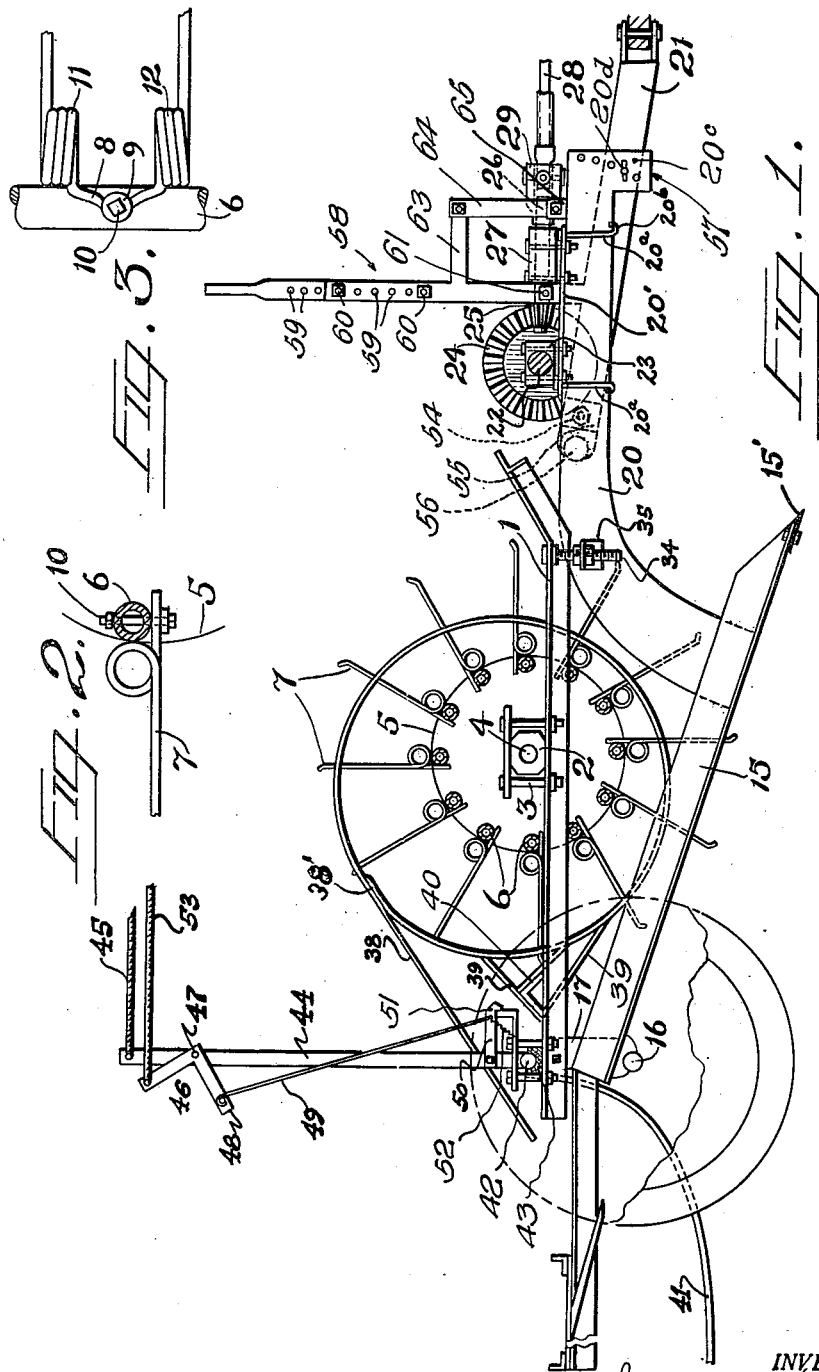
INVENTOR.
Joseph D. Stevens,
BY Frank S. Appleman,
Attorney

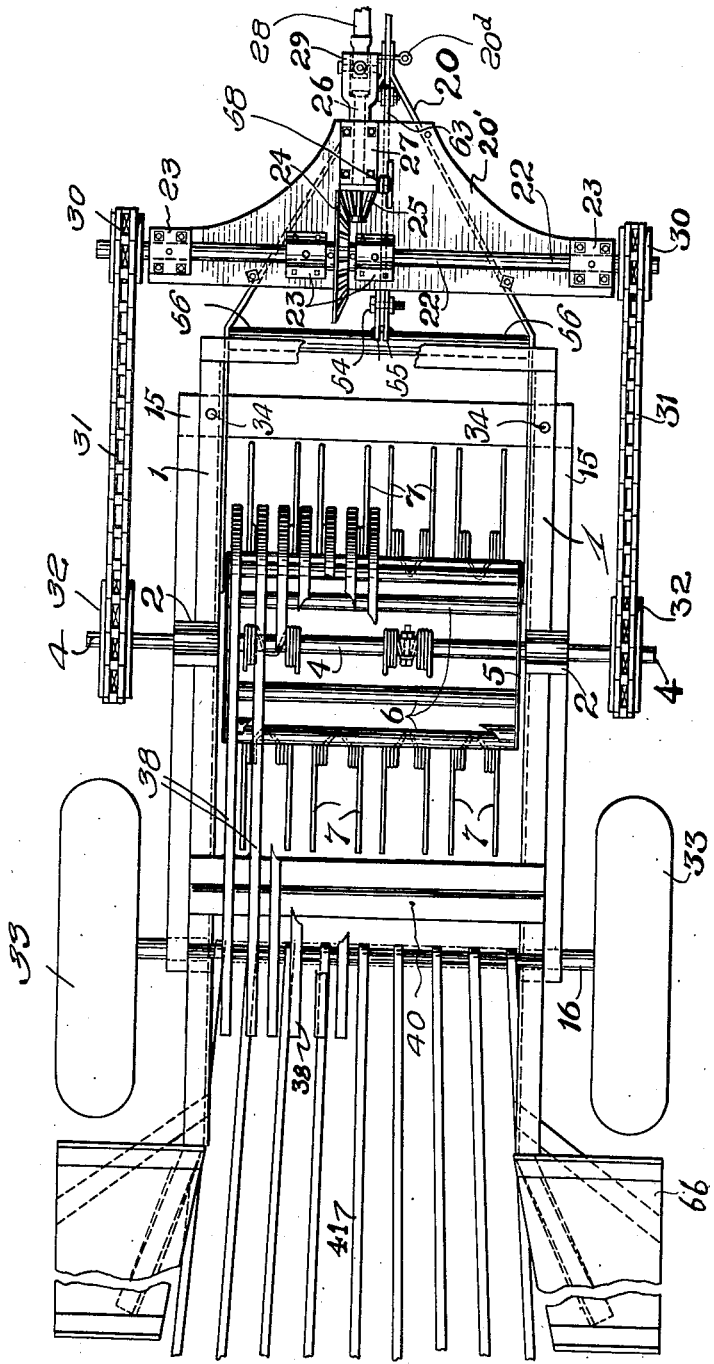

April 29, 1952     J. D. STEVENS     2,595,177
PEANUT HARVESTER PICKUP
Filed April 10, 1946     4 Sheets-Sheet 3
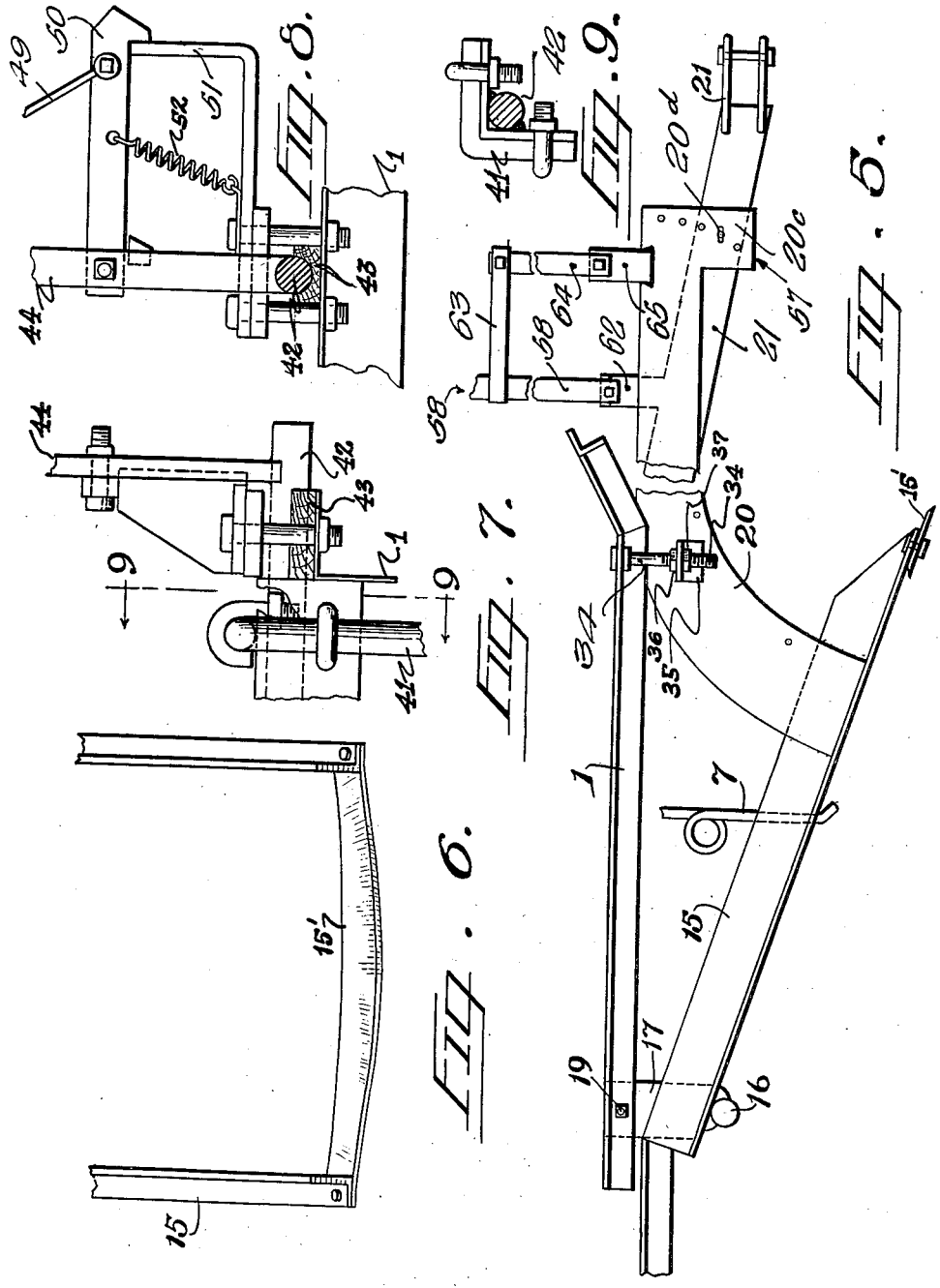
INVENTOR,
Joseph D. Stevens,
BY Frank S. Appleman,
Attorney.

April 29, 1952  J. D. STEVENS  2,595,177
PEANUT HARVESTER PICKUP
Filed April 10, 1946  4 Sheets-Sheet 4
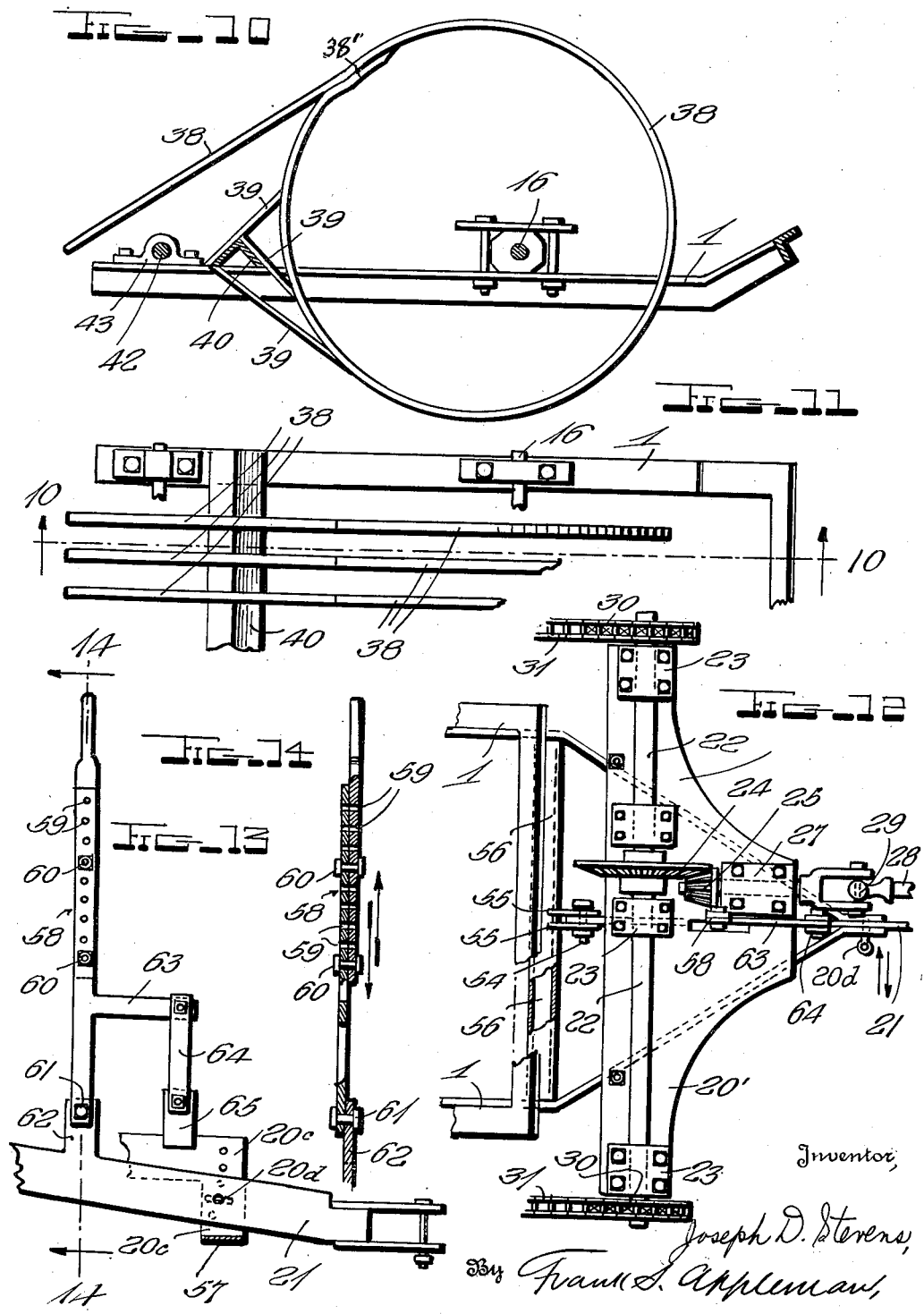

Patented Apr. 29, 1952

2,595,177

UNITED STATES PATENT OFFICE 2,595,177

PEANUT HARVESTER PICKUP

Joseph D. Stevens, Cushing, Okla.

Application April 10, 1946, Serial No. 660,914

4 Claims. (Cl. 56—364)

1

This invention relates to peanut harvesters, and it involves a machine which cuts the plant at or slightly below the ground level and is associated with novel means for lifting the plant and accumulating a bundle of vines or plants that is afterward dumped for collection and shocking or piling as for curing, as is usually done with crops of this character.

An object of the invention is to provide a blade or cutter associated with a frame mounted on wheels, and it is also associated with means for propelling the frame containing the operating mechanism.

It is furthermore an object of this invention to provide novel lifting means rotatably mounted on a frame for lifting plants or vegetation, and other means also carried by the frame for stripping the plants or vegetation from the lifting or elevating means, and to provide a collecting cradle to which the plants are delivered from the stripping means so that they may be accumulated thereon and carried until a certain amount has been so accumulated, the said cradle being detachably held in operative position and released for discharging the accumulated vegetation in piles as the machine travels.

It is furthermore an object of the invention to provide lifting means comprising a rotatably mounted cylinder and a frame for supporting the same, the said cylinder having resilient spring fingers, teeth or the like, the said cylinder being rotative within a plurality of stripper bars in such relation thereto that the center of rotation of the cylinder is eccentric to the center of curvature of the stripper bars whereby the full length of the fingers or teeth is exposed outside the curvature of the stripper bars when the fingers are in a downward position and while operating to lift the vegetation, and such that the fingers come to the curvature of the inside of the stripper bars when the fingers are in approximately vertical position, in which latter position the vegetation is wholly removed from the said fingers and is driven rearwardly by such force that the sand or earth clinging to the vegetation is agitated and removed so that the vegetation is free of dirt, sand, or the like, which may have accompanied it during the initial excavation.

A further object of the invention is to provide spring fingers having coiled sections which lift the vegetation such as peanut plants and free the peanuts of sand, earth, or the like, and the cleaning action is augmented by reason of the flexible springing action of the fingers.

A further object of this invention is to produce

2 a peanut harvester including a digger, having the characteristics indicated so that with one operation of the machine, the full harvesting activity usually accorded peanut growth is accomplished, the said means being efficient and satisfactory in use, and comparatively inexpensive to produce and maintain.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 illustrates a view in side elevation of a peanut harvester embodying the invention, parts being in section;

Figure 2 illustrates a detail view of one of the exacavating fingers with its mounting in section;

Figure 3 illustrates a plan view thereof;

Figure 4 illustrates a plan view, partly broken away, of the machine in its entirety;

Figure 5 illustrates a view in elevation of the detail structure of the frame and knife but being on a somewhat enlarged scale;

Figure 6 illustrates a plan view of the knife on a somewhat enlarged scale;

Figure 7 illustrates an enlarged detail view of the assembly of the cradle, its mounting and means for operating it;

Figure 8 illustrates an enlarged detail view of the holding latch and its mounting;

Figure 9 illustrates a sectional view on the line 9—9 of Fig. 7;

Figure 10 illustrates a vertical sectional view on the line 10—10 of Fig. 11;

Figure 11 is an enlarged plan view of a fragment of the frame and parts associated with it;

Figure 12 illustrates an enlarged detail view of the draft connections and lifting means driving mechanism;

Figure 13 illustrates a detail view on a somewhat enlarged scale of the means for adjusting the drawbar and knife attached thereto; and Figure 14 illustrates a sectional view on the line 14—14 of Fig. 13;

In the present embodiment of the invention, a suitable frame 1 has journal bearings 2 mounted on it and held in place by appropriate clips, each being collectively identified by the numeral 3. A shaft 4 is journaled in the bearings, and disks 5 are secured on the shaft. A plurality of ribs or pipes 6 extends from one disk to the other, and the pipes have their ends secured in the disks so that a skeleton wheel is formed, the pipes 6 of which carry spring fingers 7, the spring fingers being arranged in pairs formed by bending lengths of material to form a yoke 8, each yoke having a curved offset 9 in which a fastening 10, such as a bolt is seated, the said bolt also extending through the pipe on which the spring fingers are anchored. The length of material is furthermore coiled, as at 11 and 12, to form springs for the fingers. These parts are duplicated and secured in spaced relation to one another so that the number may be changed to suit particular requirements. The foregoing assembly may be known as a picker for the vegetation.

A knife or cutter 15' is located under the frame, and it is attached to two side angle bars 15 located in an inclined position. The cutter 15' comprises a knife or blade having both of its edges sharpened so that it may be reversed for prolonging its durability. The upper ends of these angle bars are supported by the axle 16. The axle supports brackets 17 which depend from the frame, and each bracket is secured to the frame by fastenings 19, such as bolts or the like, and the frame is oscillatable thereon when the frame is adjusted with relation to the beams, as will presently appear. The lower end of each angle iron has a beam element 20 attached to it, and the said beam element extends forwardly and the ends thereof converge and terminate in an apertured flange 20ᶜ, the apertures of which are intended to receive a pin or bolt 20ᵈ by which the beams are held in different positions of adjustment, as will presently appear. By reason of their connection to the drawbar 21 and by adjusting the position of the outer ends of the beams, the knife is caused to operate at different depths for its cutting operation. It is shown that the drawbar 21 has its inner end pivoted or hinged on a bolt 54 which projects through two plates, such as 55, which are welded to a bar 56, whose ends are anchored to the beams. The anchoring of the bar may be accomplished by welding or the like. The lower edges of the depending portions 20ᶜ of the beam are connected by a plate 57 to prevent them from spreading or moving with relation to each other. In order to adjust the beam with relation to the drawbar, a sectional lever 58 has sections with coinciding apertures, such as 59 in which bolts such as 60 may be lodged to hold the parts of the lever adjusted, and the lower end of the lever is oscillatable on a pivot 61 lodged in a flange or ear 62 which is integral with the drawbar. The lever furthermore has an arm 63 to which a link 64 is pivotally connected, and the link has its end pivoted to a flange or projection 65 which is integral with the beam. The two beams have identical equipment of this character so that the beams are moved in unison by the operation of the lever, and the beams are held, as stated, in different positions of adjustment by the bolt 20ᵈ which is lodged in apertures for the intended adjustment.

The beams support a metal plate 20' which acts as a base for the driving mechanism, to be presently described, and the plate is held to the beams by bolts 20ᵃ having hooks 20ᵇ embracing the lower edges of the beams. The bolts have the usual nuts on the upper surface of the plate. The driving mechanism includes a shaft 22 journaled in suitable bearings 23, and the said shaft has a beveled gear wheel 24 mounted on it which is engaged by a pinion 25, the latter of which is mounted on a shaft 26 journaled in a bearing 27 supported by the plate 20', and the said shaft 26 is connected to a drive shaft 28 through means of a universal joint 29. The shaft 22 is therefore power driven and on its ends there are sprocket wheels, such as 30, each of which drives a chain 31 connected to a sprocket wheel 32 on the shaft 4 so that the drum having the spring fingers is driven for the purpose of dislodging the vegetation which has been cut by the knife, and the said fingers carry the vegetation swiftly over the stripper bars and throw the vegetation through the air for an "air wash" that knocks the soil from the vegetation and cleans it. The frame is mounted on axle 16 of the traction wheels 33, and brackets 17 are attached to and depend from the frame and are supported on the axle 16 of the traction wheels.

The frame 1 and the beams 20 are adjustably connected together, as by a bolt 34, on each side, and each bolt extends through a flange of the frame and through an angle iron bracket 35 on the beam. The bolt is adjustable in the bracket by means of nuts 36 and 37 above and below a flange of the angle iron, so that by this means the frame may be adjusted vertically with relation to the beams for the purpose of raising or lowering the parts of the mechanism having the spring fingers in order that the fingers may be caused to penetrate the soil to a greater or lesser degree as proves desirable, it being understood that the frame will rock on the bolt 19.

Stripper bars 38 each comprises a length of metal curved to form an approximate ring and one end thereof underlies a portion of the metal and is secured thereto by welding 38' or the like, whereas there is a projecting end reaching well beyond the welded joint thus described, on which the vegetation travels as it descends to the cradle or carrier, presently referred to. The circular portion of the stripper bar is anchored to the frame 1 and to accomplish this result, an angle iron 40 is supported on the frame and secured thereto by welding, and the stripper bar is furthermore supported or braced by metal strips or plates 39 which are welded to the angle iron, whereas their ends are welded to the stripper bar, there being one such installation for each stripper bar. As shown in the drawing, the fingers project well beyond the stripper bars in their digging position, but owing to the eccentric relation of the digger to the stripper bars, the fingers gradually recede and at the last portion of their movement are traveling just between the stripper bars. It is desirable to have this relation of parts as the fingers should not recede beyond the inner surfaces of the stripper bars, as they might become distorted and fail to register with the spaces between the bars. Hence, the vegetation is gradually stripped from the fingers and the movement of the vegetation is so fast that the vegetation is driven through the air so that the earth deposits on the roots of the vegetation are dislodged and the vegetation is "air washed". The vegetation then descends onto a carrier where it accumulates, to a certain degree, and when the accumulation has reached a desirable volume, it is dumped in piles as the picker travels through the fields. The means for holding the vegetation as it accumulates comprises a cradle-like projection at the rear of the frame and includes a plurality of teeth or metal strips 41 whose inner ends are secured on a shaft 42, which is rotatable in bearings, such as 43. The shaft 42 has an arm 44 which extends upwardly, and an operating flexible member or rope 45 is connected to it, which leads forwardly to the operator of a tractor, so that when the operator wishes to dump the load from the cradle, he releases the lever and the weight of the contents of the cradle causes it to drop and release its load. Means are provided for holding the lever with the cradle in operative position until the load is to be dumped, and for this purpose a bell crank lever 46 is pivoted, as at 47, to the arm 44. One arm 48 of the bell crank lever has a connecting rod or link 49 connected to it, and the said rod or link is connected to a latch 50 also pivoted on the arm 44, and the latch engages a bracket 51 associated with the bearing retaining equipment as illustrated in Fig. 8, the details of which are obvious from an inspection of the drawing. The latch is under tension of a spring 52 which serves to retain the latch in engagement with its bracket, but when the operator pulls a rope or connection 53 connected to the other arm of the bell crank lever, the latch is elevated out of engagement with the bracket and the load is dumped by gravity, as heretofore described.

In order to prevent the load of the cradle from being dislodged therefrom by wind, a suitable side shield of metal may be placed at the side edges of the cradle so that the force of the wind will be broken to an extent that the load will not be disturbed.

In referring to the lifting instrumentality as having fingers, it is to be understood that the term "tines, teeth or pins" might be regarded as the equivalent thereof.

In operation, the harvester is caused to travel at approximately 6½ miles per hour and the gearing is such between the driving shaft and the excavating means that the said excavating means rotates at such a speed that when vegetation is carried over the stripper bars and then dislodged from the fingers, the said vegetation travels through the air at such velocity that the deposits of soil thereon are dislodged and the vegetation is freed by what is termed "air washing."

There is shown in plan on Figure 4, platforms 66 which may be occupied by an attendant who can arrange the vegetation on the cradle as it is delivered to the cradle.

While the device is shown as being mounted on wheels, it is obvious that it may be installed on means by which it is transported.

I claim:

1. In a peanut harvester, a mobile frame, a rotatable body journalled in the frame for rotation about a horizontal axis, a plurality of yieldable fingers extending outwardly from the rotatable body and fixedly secured to the said body, a plurality of spaced apart stripper bars mounted on the frame rearwardly of the rotatable body, each stripper bar including a length of metal curved longitudinally between its ends and having one of the ends underlying an intermediate portion of the metal and secured thereto to form a circular band, the opposite end of said metal length projecting rearwardly to form supports on which the vegetation is discharged rearwardly, the yieldable fingers on the rotatable body being adapted to travel in the spaces between the stripper bars during rotation of the rotatable body, the said rotatable body and yieldable fingers being eccentrically mounted with respect to the stripper bars so that the full length of the tines is exposed outside the curvature of the stripper bars when the tines are in a downward position, and so that the tines come to the curvature of the inside of the bars when the tines are in a vertical position, a source of power, and a drive connection between the source of power and the rotatable body.

2. In a device of the character described according to claim 1, in which the yieldable fingers comprise lengths of resilient material doubled on itself to form a yoke, and in which the material on each side of the yoke is coiled to form a spring whereby the resilient action of the fingers is increased.

3. A peanut harvester comprising a mobile frame, a rotatable body journalled in the frame for rotation about a horizontal axis, a plurality of spaced outwardly extending yieldable fingers fixedly secured to the rotatable body, a plurality of spaced apart stripper bars mounted on the frame rearwardly of the rotatable body, each stripper bar including a length of metal curved longitudinally between its ends and having one of the ends underlying an intermediate portion of the metal and secured thereto to form a circular band, the opposite end of said metal length projecting rearwardly to form supports on which the vegetation is discharged rearwardly, the yieldable fingers being adapted to travel in the spaces between the stripper bars during rotation of the rotatable body, the said rotatable body and yieldable fingers being eccentrically mounted with respect to the stripper bars so that the full length of the tines is exposed outside the curvature of the stripper bars when the tines are in a downward position, and so that the tines come to the curvature of the inside of the bars when the tines are in a vertical position, a cradle secured to the frame rearwardly of the stripper bars for receiving the peanuts, hand operated means to hold the cradle in an operative position, further means to release said hand operated means to dump the peanuts from the cradle, and power operated means to impart rotary movement to the rotatable body.

4. A peanut harvester comprising a mobile frame, a rotatable body journalled in the frame for rotation about a horizontal axis, a plurality of spaced outwardly extending yieldable tines fixedly secured to the rotatable body, a plurality of spaced apart stripper bars mounted on the frame rearwardly of the rotatable body, each stripper bar including a length of metal curved longitudinally between its ends and having one of the ends underlying an intermediate portion of the metal and secured thereto to form a circular band, the opposite end of said metal length projecting rearwardly to form supports on which the vegetation is discharged rearwardly, the yieldable tines being adapted to travel in the spaces between the stripper bars during rotation of the rotatable body, the said rotatable body and yieldable tines being eccentrically mounted with respect to the stripper bars so that the full length of the tines is exposed outside the curvature of the stripper bars when the tines are in a downward position, and so that the tines come to the curvature of the inside of the bars when the tines are in a vertical position, a cradle pivotally mounted to the frame rearwardly of the stripper bars for movement about a horizontal axis with the rearwardly and downwardly projecting ends of the stripper bars extending over the cradle, means for holding the cradle in an operative position, means operatively connected with said cradle holding means to permit the cradle to move downwardly about its pivot, and power operated means to impart rotary movement to the rotatable body.

JOSEPH D. STEVENS.

REFERENCES CITED

The following references are of record in the file of this patent:

UNITED STATES PATENTS

| Number | Name | Date |
|---|---|---|
| 71,577 | Brown | Dec. 3, 1867 |
| 1,145,282 | Warren | July 6, 1915 |
| 1,154,368 | Boyd | Sept. 21, 1915 |
| 1,293,144 | McKinley | Feb. 4, 1919 |
| 1,371,519 | Roosa | Mar. 15, 1921 |
| 1,947,556 | Krause | Feb. 20, 1934 |
| 2,141,557 | Reiter | Dec. 27, 1938 |
| 2,167,044 | Henderson | July 25, 1939 |
| 2,237,002 | Kelley | Apr. 1, 1941 |
| 2,256,829 | Hyman | Sept. 23, 1941 |
| 2,362,861 | Russell | Nov. 14, 1944 |
| 2,378,107 | Russell | June 12, 1945 |